United States Patent
Hamo et al.

(10) Patent No.: US 12,271,300 B2
(45) Date of Patent: Apr. 8, 2025

(54) DATA STORAGE DEVICE AND METHOD FOR PERFORMING AN ACTION ON AN AREA OF MEMORY TO SATISFY A HOST-PROVIDED TARGET OPERATING CONDITION

(71) Applicant: Western Digital Technologies, Inc., San Jose, CA (US)

(72) Inventors: Eyal Hamo, Naharia (IL); Sagi Taragan, Ramat Ishay (IL); Dvorah Freedman, Jerusalem (IL)

(73) Assignee: Sandisk Technologies, Inc., Milpitas, CA (US)

( * ) Notice: Subject to any disclaimer, the term of this patent is extended or adjusted under 35 U.S.C. 154(b) by 25 days.

(21) Appl. No.: 18/226,347

(22) Filed: Jul. 26, 2023

(65) Prior Publication Data
US 2024/0411684 A1    Dec. 12, 2024

Related U.S. Application Data (60) Provisional application No. 63/471,403, filed on Jun. 6, 2023.

(51) Int. Cl.
  *G06F 12/00* (2006.01)
  *G06F 12/02* (2006.01)
(52) U.S. Cl.
  CPC ................................ *G06F 12/0238* (2013.01)
(58) Field of Classification Search
  CPC .................................................... G06F 12/0238
  USPC .......................................................... 711/154
  See application file for complete search history.

(56) References Cited

U.S. PATENT DOCUMENTS

| | | |
|---|---|---|
| 8,289,797 B2 | 10/2012 | Jain et al. |
| 8,341,497 B2 | 12/2012 | Fukutomi et al. |
| 8,601,204 B2 | 12/2013 | Rajan et al. |
| 8,705,307 B2 | 4/2014 | Henderson et al. |
| 10,665,273 B2 | 5/2020 | Kim et al. |
| 10,802,911 B2 | 10/2020 | Shulkin et al. |

(Continued)

FOREIGN PATENT DOCUMENTS

| | | |
|---|---|---|
| CN | 114492269 A | 5/2022 |
| WO | WO 2022/072993 A1 | 4/2022 |

OTHER PUBLICATIONS

International Search Report and Written Opinion mailed May 17, 2024 from PCT/US2024/011245.

(Continued)

*Primary Examiner* — Mardochee Chery
(74) *Attorney, Agent, or Firm* — Crowell & Moring LLP

(57) ABSTRACT

A data storage device and method are provided for performing an action on an area of memory to satisfy a host-provided target operating condition. In one embodiment, a controller of the data storage device is configured to: receive, from a host, an identification of an area of the memory and a target operating condition for the area of the memory; monitor the area of the memory to determine whether the area of the memory satisfies the target operating condition; and in response to determining that the area of the memory does not satisfy the target operating condition, perform an action on the area of the memory to attempt to cause the area of the memory to satisfy the target operating condition. Other embodiments are provided, and each of the embodiments can be used alone or in combination.

20 Claims, 6 Drawing Sheets

(56) References Cited

U.S. PATENT DOCUMENTS

| | | | |
|---|---|---|---|
| 10,996,863 B1 | 5/2021 | Kuzmin et al. | |
| 11,188,268 B1 | 11/2021 | Sharon et al. | |
| 2011/0093726 A1 | 4/2011 | Worthington et al. | |
| 2012/0166828 A1* | 6/2012 | Maroney | G06F 1/3268 |
| | | | 713/320 |
| 2014/0059287 A1 | 2/2014 | Bains et al. | |
| 2014/0085999 A1 | 3/2014 | Kang | |
| 2014/0229774 A1* | 8/2014 | Melik-Martirosian | |
| | | | G06F 3/0634 |
| | | | 714/704 |
| 2018/0024920 A1 | 1/2018 | Thomas et al. | |
| 2018/0025772 A1 | 1/2018 | Lee et al. | |
| 2018/0374546 A1 | 12/2018 | Shi et al. | |
| 2020/0042207 A1 | 2/2020 | Kwak et al. | |
| 2020/0089410 A1 | 3/2020 | Park et al. | |
| 2021/0182166 A1 | 6/2021 | Hahn et al. | |
| 2022/0189535 A1 | 6/2022 | Kim | |
| 2024/0078022 A1* | 3/2024 | Zhou | G06F 3/061 |

OTHER PUBLICATIONS

"HMR: Add support for the new command type"; beanhuo/ufs-utils-Micron; Dec. 9, 2019; 3 pages.

"Data scrubbing"; Wikipedia article; Wikipedia—The Free Encyclopedia; downloaded from the Internet on Jul. 24, 2023 at https://en/wikipedia.org/wiki/Data_scrubbing; Apr. 10, 2022; 5 pages.

"Integrated UFS4.0 Specification"; JEDEC Committee Letter Ballot, Item JC64.1 #139.55; JEDEC; Feb. 9, 2022; 495 pages.

"nvme-get-lba-status—Get LBA Status from NVMe device"; NVME program user space utility for NVME Manuel, version 2.5-1; downloaded from the Internet on Jul. 24, 2023 at nvme-get-lba-status(1)—Arch manual pages (archlinux.org); ARCH Linux; Jul. 2, 2023; 3 pages.

"nvme-get-lba-status—Get LBA Status from NVMe device"; NVME program user space utility; 22.044 LTS; downloaded from the Internet on Jul. 24, 2023 at Ubuntu Manpage: nvme-get-lba-status—Get LBA Status from NVMe device; Ubuntu; Canonical Ltd.; 2019; 4 pages.

* cited by examiner

DATA STORAGE DEVICE AND METHOD FOR PERFORMING AN ACTION ON AN AREA OF MEMORY TO SATISFY A HOST-PROVIDED TARGET OPERATING CONDITION

CROSS-REFERENCE TO RELATED APPLICATION

This application claims priority to U.S. provisional patent application No. 63/471,403, filed Jun. 6, 2023, which is hereby incorporated by reference.

BACKGROUND

A host can store and read data from a memory in a data storage device. The reliability of the data storage device can decrease due to various errors that can occur in the stored data. Such errors can also increase latency in reading the data, as time is spent by the data storage device during the read operation to attempt to correct the errors in the data.

DETAILED DESCRIPTION

The following embodiments generally relate to a data storage device and method for performing an action on an area of memory to satisfy a host-provided target operating condition. In one embodiment, a data storage device is provided comprising a memory and a controller. The controller is configured to: receive, from a host, an identification of an area of the memory and a target operating condition for the area of the memory; monitor the area of the memory to determine whether the area of the memory satisfies the target operating condition; and in response to determining that the area of the memory does not satisfy the target operating condition, perform an action on the area of the memory to attempt to cause the area of the memory to satisfy the target operating condition.

In some embodiments, the action is automatically performed in response to determining that the area of the memory does not satisfy the target operating condition.

In some embodiments, the controller is further configured to inform the host that the area of the memory does not satisfy the target operating condition, and the action is performed in response to receiving a command from the host to perform the action.

In some embodiments, the target operating condition comprises latency, reliability, efficiency, performance, and/or power consumption.

In some embodiments, the action comprises a host-initiated defragmentation operation.

In some embodiments, the action comprises a file-based optimization operation.

In some embodiments, the action comprises a host memory refresh operation.

In some embodiments, the action comprises moving data from a single-level cell (SLC) block to a multi-level cell (MLC) block.

In some embodiments, the action comprises updating a read threshold.

In some embodiments, the action comprises caching a part of a logical-to-physical address table.

In some embodiments, the memory comprises a three-dimensional memory array.

In another embodiment, a method that is provided that is performed in a data storage device comprising a memory. The method comprises: receiving, from a host, a logical block address (LBA) range and a target operating condition; determining whether the LBA range satisfies the target operating condition; and in response to determining that the LBA range memory does not satisfy the target operating condition, performing an action on the LBA range to attempt to cause the LBA range to satisfy the target operating condition.

In some embodiments, the method further comprises receiving, from the host, a mode of work that specifies whether the action should be performed automatically or in response to a command from the host.

In some embodiments, the target operating condition comprises latency.

In some embodiments, the target operating condition comprises reliability.

In some embodiments, the target operating condition comprises efficiency.

In some embodiments, the target operating condition comprises performance.

In some embodiments, the target operating condition comprises power consumption.

In some embodiments, the action comprises a host-initiated defragmentation operation, a file-based optimization operation, a host memory refresh operation, moving data from a single-level cell (SLC) block to a multi-level cell (MLC) block, updating a read threshold, and/or caching a part of a logical-to-physical address table.

In another embodiment, a data storage device is provided comprising: a memory; means for receiving, from a host, an identification of an area of the memory and a target operating condition for the area of the memory; means for monitoring the area of the memory to determine whether the area of the memory satisfies the target operating condition; and means for performing an action on the area of the memory to attempt to cause the area of the memory to satisfy the target operating condition in response to determining that the area of the memory does not satisfy the target operating condition.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, NAND flash memory devices (e.g., according to the Universal File System (UFS) specification), hard disk drives (HDDs), solid state drives (SSDs), tape drives, hybrid drives, etc. Details of example DSDs are provided below.

Figures 1A, 1B:
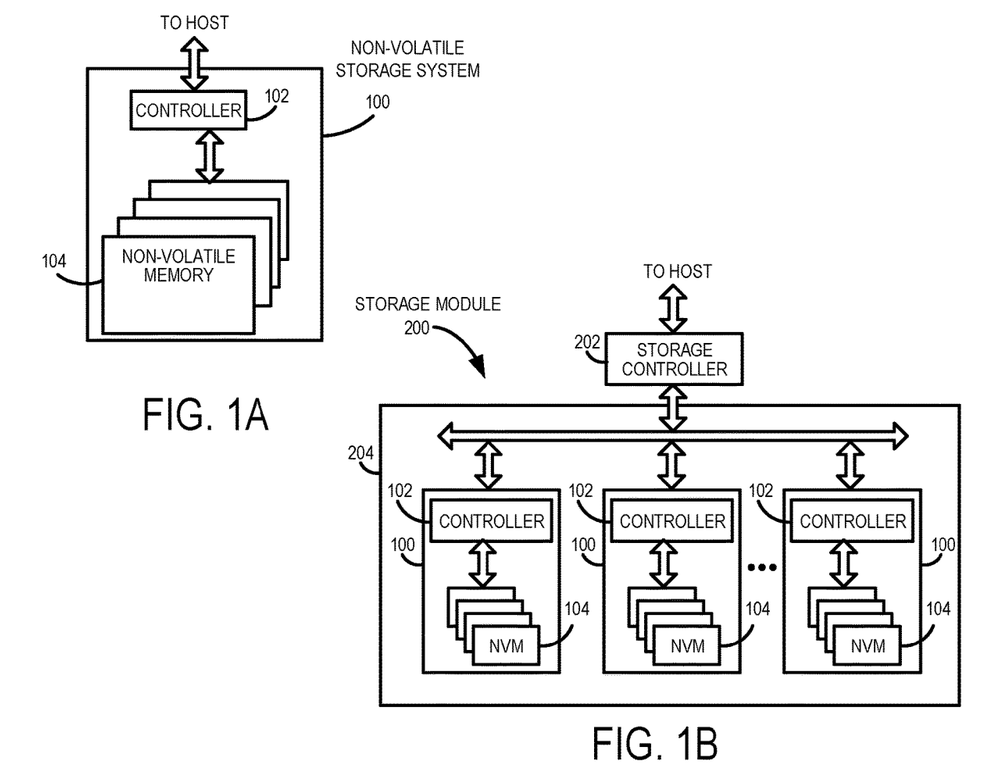
FIG. 1A is a block diagram of a data storage device of an embodiment.
FIG. 1B is a block diagram illustrating a storage module of an embodiment.
Figure 1C:
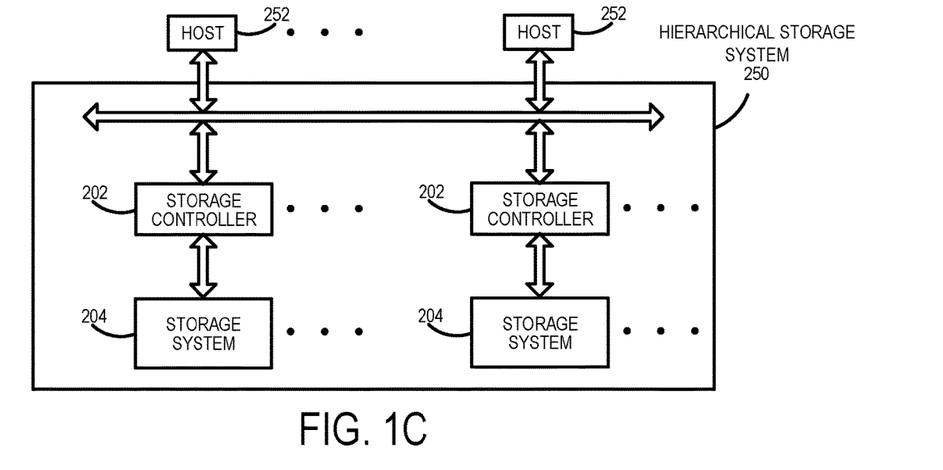
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
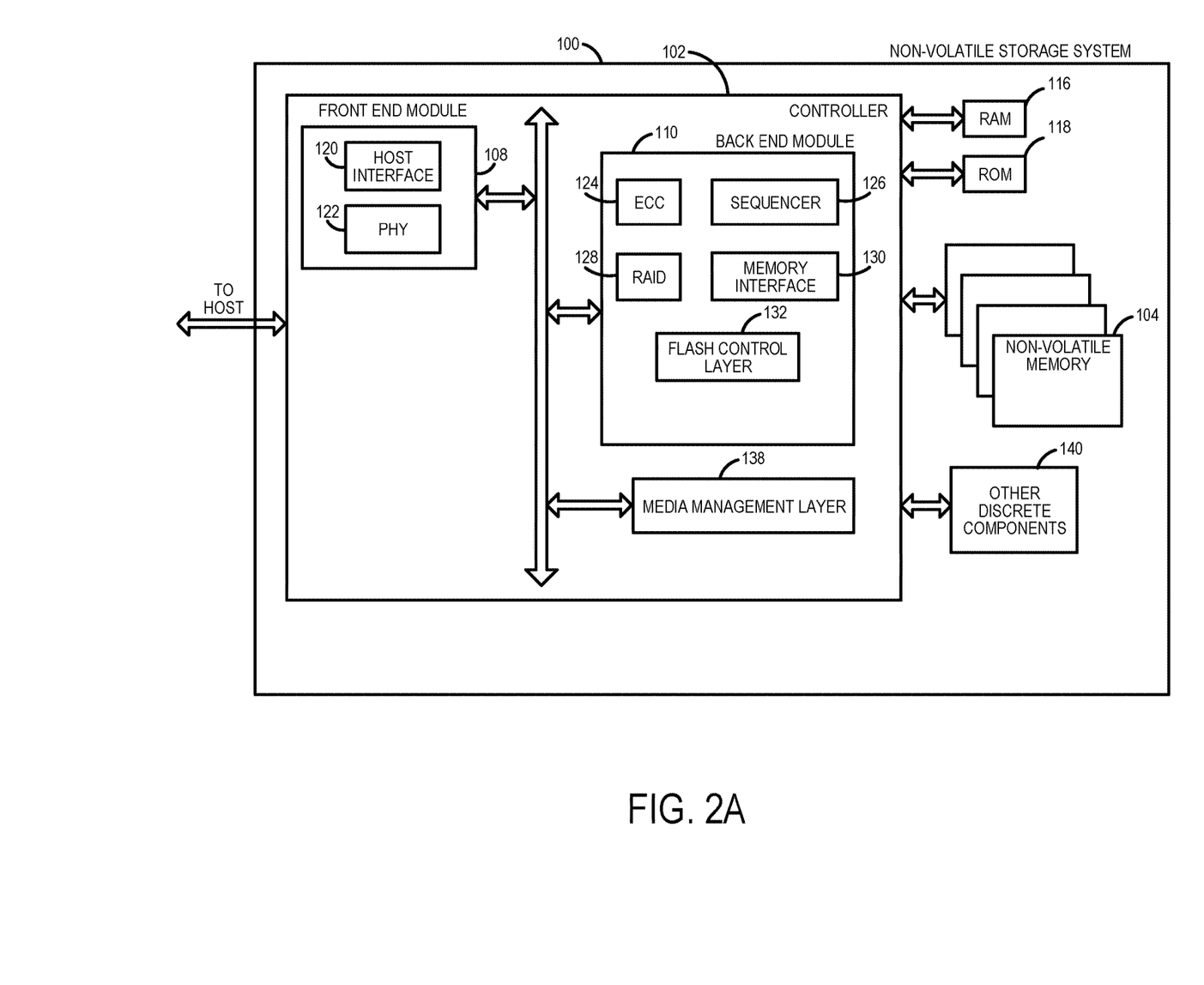
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
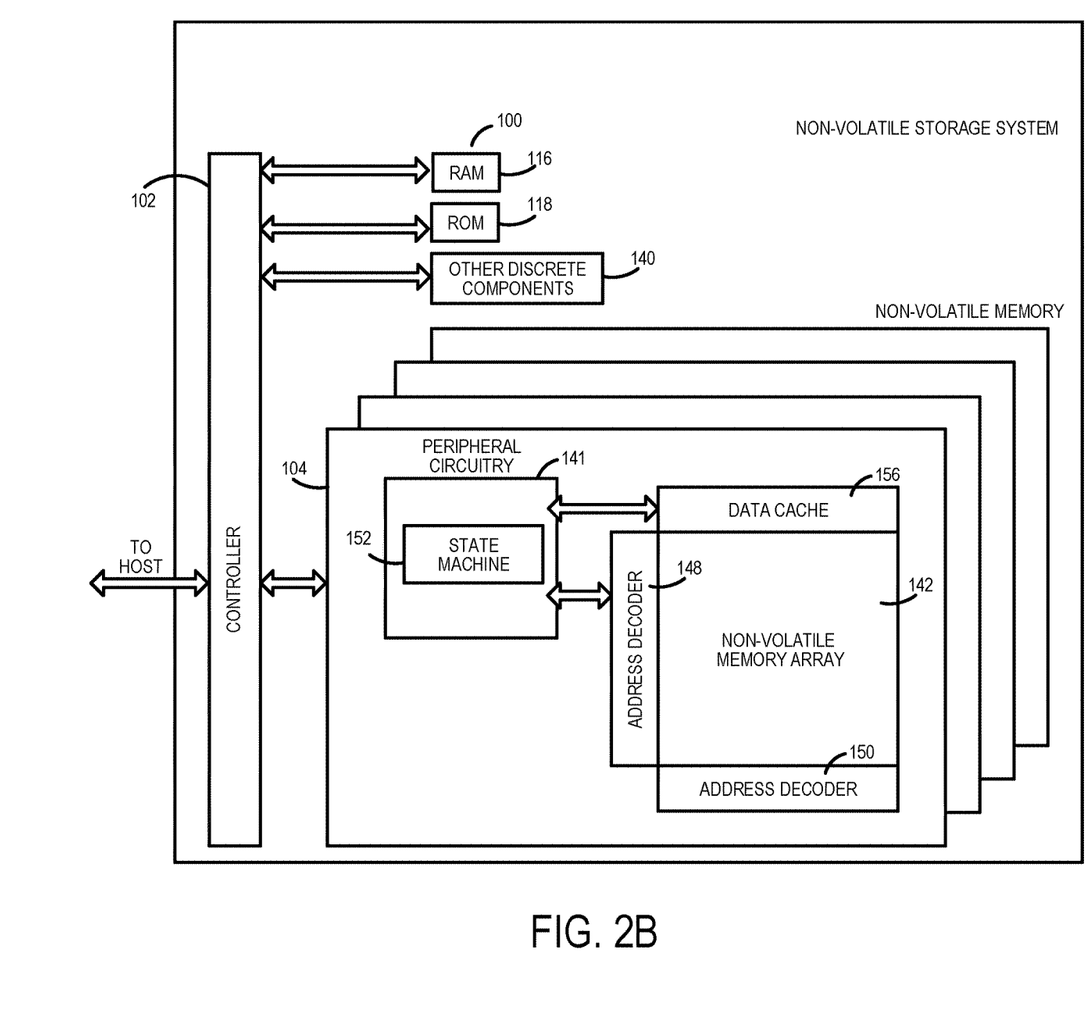
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
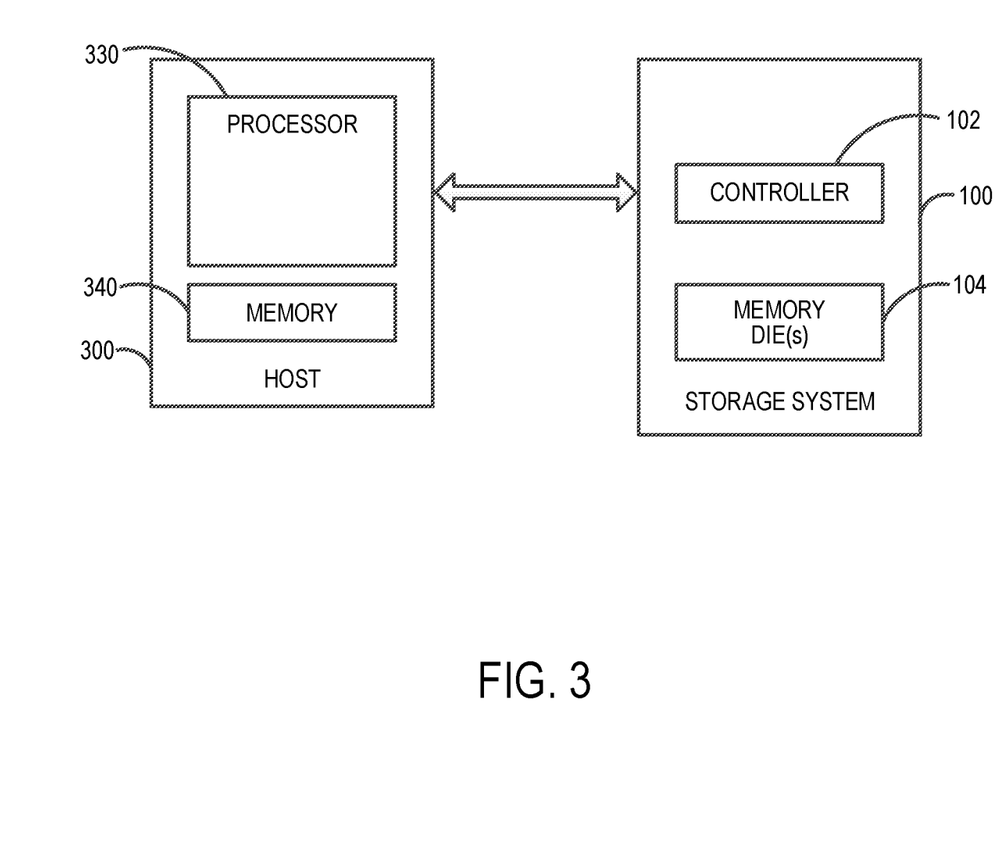
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In one embodiment, the host 300 provides the data storage device 100 with an identification of an area of the memory 104 (e.g., a logical block address range) and a target operating condition for the area of the memory 104. The target operating condition can take any suitable form, including, but not limited to, latency, reliability, efficiency, performance, and/or power consumption. The controller 102 of the data storage device 100 monitors the area of the memory 104 to determine whether the area of the memory 104 satisfies the target operating condition.

If the area of the memory 104 does not satisfy the target operating condition, the controller 103 can perform an action on the area of the memory 104 to attempt to cause the area of the memory 104 to satisfy the target operating condition. The action take any suitable form, such as, but not limited to, a host-initiated defragmentation (HID) operation, a file-based optimization (FBO) operation, a host memory refresh (HMR) operation where the data storage device 100 performs a background refresh operation on the specified area of the memory 104, moving data from a single-level cell (SLC) block to a multi-level cell (MLC) block, updating a read threshold, and/or caching a part of a logical-to-physical address table. Some of these example actions are discussed in the Universal Flash Storage (UFS) 3.1 specification for the host 300 to request. With these embodiments, however, the controller 102 of the data storage device 100 would select which one to use, so they are not directly requested by the host 300. Further, with these embodiments, the amount of time that a feature/action is active can be reduced, and it can be performed on a specific problematic area of the memory 104 (i.e., only those actions that are needed to achieve the target goals of the area are activated).

The controller 102 can perform the action automatically in response to determining that the area of the memory 104 does not satisfy the target operating condition. Alternatively, the controller 102 can inform the host 300 that the area of the memory 104 does not satisfy the target operating condition, and the controller 102 can perform the action in response to receiving a command from the host 300 to perform the action. This can be specified in a mode of work from the host 300. For example, in an "automatic" mode of work, the controller 102 can automatically perform the action without any specific interruption or definition by the host 300. In an "on demand" mode of work, the host 300 triggers a specific feature/capability of the data storage device 100 on a defined target goal.

With these embodiments, the host 300 has the ability to create and send a simple request to the data storage device 100. The request can use a common and simple interface without triggering a specific data storage device ability. The data storage device 100 and the host 300 can have a dedicated interface that allows the host 300 to set the target operating condition (sometimes referred to herein as "target goals") and for the controller 102 in the data storage device 100 to act accordingly with a proper capability. In some embodiments, the controller 102 in the data storage device 100 can send a recommendation to the host 300 once it reaches one of its predefined target goals by using the dedicated interface.

There are several advantages associated with these embodiments. For example, these embodiments can reduce the bus communication between the host 300 and the data storage device 100 by the host 300 defining a set of target goals that the data storage device 100. As another example, these embodiments can solve a file system use case situation where there are dedicated areas that are managed by the host 300. Further, these embodiments allow the data storage device 100 to control features to enable the best solution. Also, by having the actions focus on specific areas of the memory 104, these embodiments can be efficient in terms of time and resources. Additionally, these embodiments can improve the lifetime of the data storage device 100.

Figure 4:
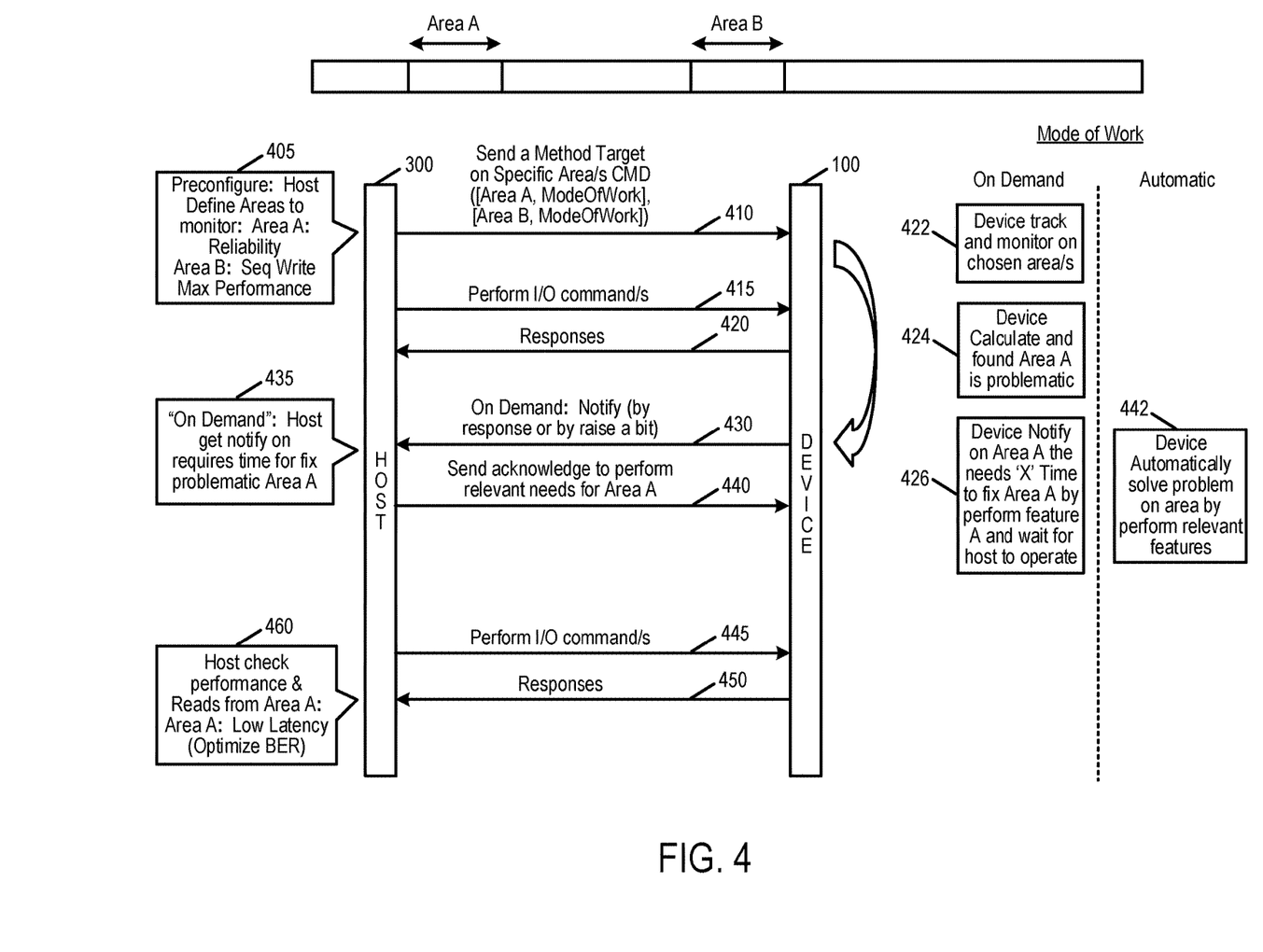
FIG. 4 is a flow diagram of an automatic/on-demand mode of work for a specific area of a memory of an embodiment.
Figure 5:
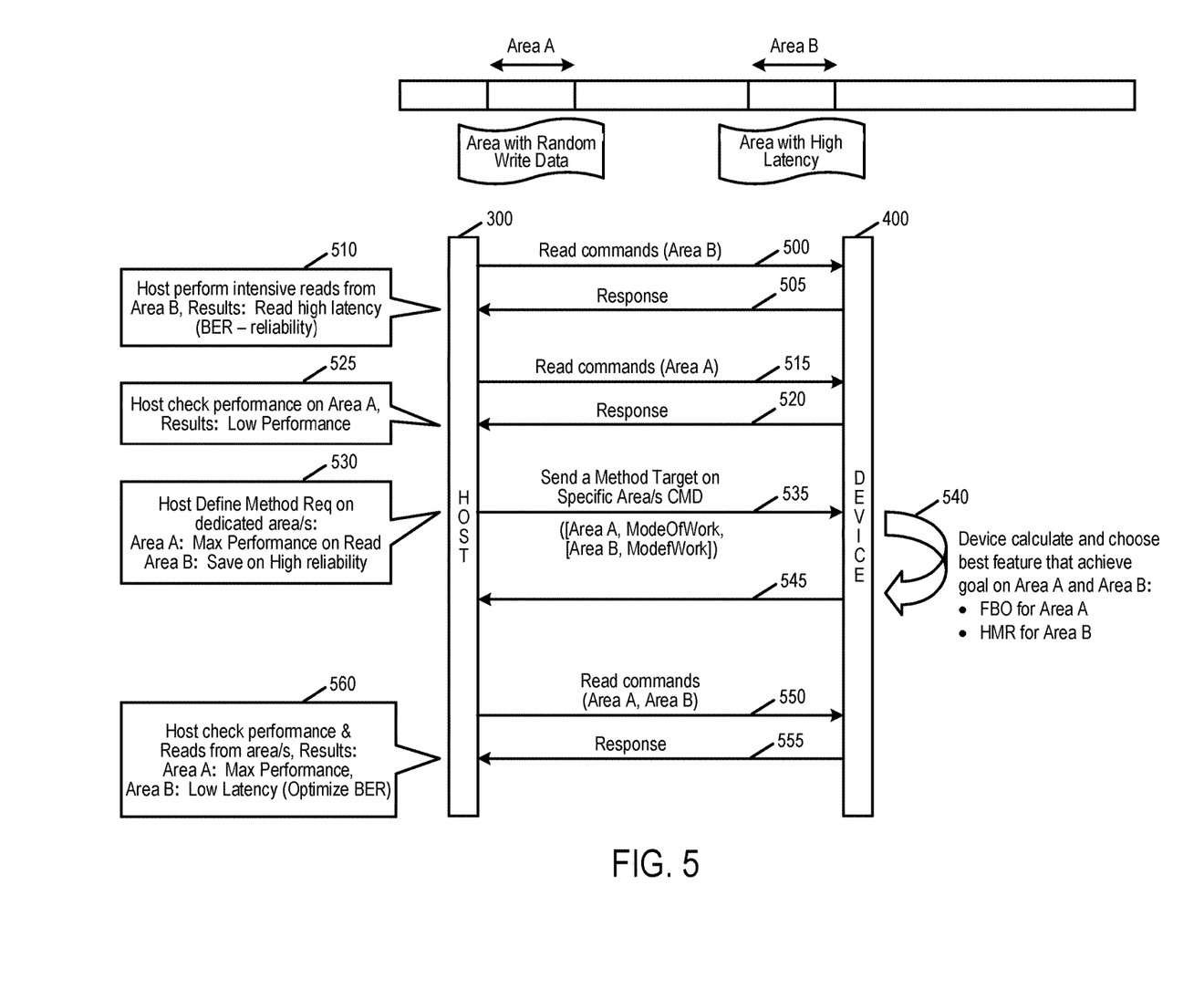
FIG. 5 is a flow diagram of an active operation on a specific area of a memory of an embodiment.

FIGS. 4 and 5 are flow diagrams that illustrate examples of these embodiments. Turning first to FIG. 4, in this example, the host 300 defines Area A in the memory 104 (e.g., logical unit number (LUN) 0x2, LBA range 300-800) for a certain reliability target and defines Area B in the memory 104 (e.g., LUN 0xB (boot), LBA range 0-100) for a certain sequential write maximum performance. The host 300 then sends these target requests and modes of work to the data storage device 100 (act 410). If the mode of work is "automatic," the controller 102 in the data storage device 100 automatically performs action(s) to correct any detected problem (act 442).

If the mode of work is "on demand," the controller 102 in the data storage device 100 performs various acts as input/output (I/O) commands and responses are passed between the host 300 and the data storage device 100 (acts 415, 420). More specifically, the controller 102 of the data storage device 100 tracks and monitors Areas A and B (act 422). In this example, the controller 102 finds that Area A is not meeting its reliability target goal (act 424). In response, the controller 102 generates a notification of such, as well as the time and action(s) needed to correct the problem (act 426). The controller 102 sends the notification to the host 300 (act 430). The host 300 receives the notification (act 435) and sends an acknowledgement to command the controller 102 to perform the action(s) (act 440). After additional input/output (I/O) commands and responses are passed between the host 300 and the data storage device 100 (acts 445, 450), the host 300 checks to see if the problem has been addressed (act 460).

Turning now to FIG. 5, in this example, Area A is used to store random write data, and Area B has high latency. The host 300 performs intensive reads from Area B (acts 500, 505), which results in a high read latency (act 510). During additional reads (acts 515, 520), the host 300 checks the performance of Area A and detects a low performance (act 525). The host 300 then sets the targets for Areas A and B (act 530) and sends them to the data storage device 100 (act 535). In response, the controller 102 in the data storage device 100 calculates and chooses the best actions for each Area to achieve the goals (act 540). After additional reads (acts 550, 555), the host 300 checks to see if the goals have been satisfied (act 560).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
 a memory; and
 a processor configured to communicate with the memory and further configured to:
  receive, from a host, an identification of a first area of the memory and a first target operating condition for the first area of the memory;
  receive, from the host, an identification of a second area of the memory and a second target operating condition for the second area of the memory, wherein the second target operating condition is different from the first target operating condition;
  monitor the first and second areas of the memory to determine whether the first and second areas of the memory satisfy the first and second target operating conditions, respectively;
  in response to determining that the first area of the memory does not satisfy the first target operating condition, perform a first action on the first area of the memory to attempt to cause the first area of the memory to satisfy the first target operating condition; and in response to determining that the second area of the memory does not satisfy the second target operating condition, perform a second action on the second area of the memory to attempt to cause second first area of the memory to satisfy the second target operating condition, wherein the second action is different from the first action.

2. The data storage device of claim 1, wherein the first action is automatically performed in response to determining that the first area of the memory does not satisfy the first target operating condition.

3. The data storage device of claim 1, wherein:
the processor is further configured to inform the host that the first area of the memory does not satisfy the first target operating condition; and
the first action is performed in response to receiving a command from the host to perform the first action.

4. The data storage device of claim 1, wherein the first target operating condition comprises latency, reliability, efficiency, performance, and/or power consumption.

5. The data storage device of claim 1, wherein the first action comprises a host-initiated defragmentation operation.

6. The data storage device of claim 1, wherein the first action comprises a file-based optimization operation.

7. The data storage device of claim 1, wherein the first action comprises a host memory refresh operation.

8. The data storage device of claim 1, wherein the first action comprises moving data from a single-level cell (SLC) block to a multi-level cell (MLC) block.

9. The data storage device of claim 1, wherein the first action comprises updating a read threshold.

10. The data storage device of claim 1, wherein the first action comprises caching a part of a logical-to-physical address table.

11. The data storage device of claim 1, wherein the memory comprises a three-dimensional memory array.

12. A method comprising:
performing in a data storage device comprising a memory:
receiving, from a host, a first logical block address (LBA) range and a first target operating condition;
receiving, from the host, a second LBA range and a second target operating condition, wherein the second target operating condition is different from the first target operating condition;
determining whether the first LBA range satisfies the first target operating condition;
in response to determining that the first LBA range memory does not satisfy the first target operating condition, performing a first action on the first LBA range to attempt to cause the first LBA range to satisfy the first target operating condition:
determining whether the second LBA range satisfies the second target operating condition; and
in response to determining that the second LBA range memory does not satisfy the first target operating condition, performing a second action on the second LBA range to attempt to cause the second LBA range to satisfy the second target operating condition, wherein the second action is different from the first action.

13. The method of claim 12, further comprising:
receiving, from the host, a mode of work that specifies whether the first action should be performed automatically or in response to a command from the host.

14. The method of claim 12, wherein the first target operating condition comprises latency.

15. The method of claim 12, wherein the first target operating condition comprises reliability.

16. The method of claim 12, wherein the first target operating condition comprises efficiency.

17. The method of claim 12, wherein the first target operating condition comprises performance.

18. The method of claim 12, wherein the first target operating condition comprises power consumption.

19. The method of claim 12, wherein the first action comprises a host-initiated defragmentation operation, a file-based optimization operation, a host memory refresh operation, moving data from a single-level cell (SLC) block to a multi-level cell (MLC) block, updating a read threshold, and/or caching a part of a logical-to-physical address table.

20. A data storage device comprising:
a memory; and
means for:
receiving, from a host, an identification of a first area of the memory and a first target operating condition for the first area of the memory;
receiving, from the host, an identification of a second area of the memory and a second target operating condition for the second area of the memory, wherein the second target operating condition is different from the first target operating condition;
monitoring the first and second areas of the memory to determine whether the first and second areas of the memory satisfy the first and second target operating conditions, respectively;
in response to determining that the first area of the memory does not satisfy the first target operating condition, performing a first action on the first area of the memory to attempt to cause the first area of the memory to satisfy the first target operating condition; and
in response to determining that the second area of the memory does not satisfy the second target operating condition, performing a second action on the second area of the memory to attempt to cause second first area of the memory to satisfy the second target operating condition, wherein the second action is different from the first action.

* * * * *